United States Patent [19]

Best et al.

[11] Patent Number: 5,239,622
[45] Date of Patent: Aug. 24, 1993

[54] BARCODE IDENTIFICATION SYSTEM FORMAT EDITOR

[75] Inventors: David J. Best, Miamisburg; James E. Globig, Hamilton; James G. Markham, Spring Valley, all of Ohio

[73] Assignee: Monarch Marking Systems, Inc., Dayton, Ohio

[21] Appl. No.: 783,579

[22] Filed: Oct. 28, 1991

[51] Int. Cl.$^5$ ............................................. G06F 15/00
[52] U.S. Cl. ..................................... 395/117; 395/112
[58] Field of Search ............... 395/101, 110, 112, 114, 395/117, 325, 500; 400/103, 104; 235/462

[56] References Cited

U.S. PATENT DOCUMENTS 4,917,011 4/1990 Bernauer ............................ 400/103
5,146,544 9/1992 Altham ............................... 395/114

*Primary Examiner*—Arthur G. Evans
*Attorney, Agent, or Firm*—McAndrews, Held & Malloy, Ltd.

[57] ABSTRACT

A barcode identification system format editor is shown which allows a single format to automatically be created for multiple, incompatible printers. The system includes a number of barcode printers of various types, each barcode printer type having an associated set of printer function options selectable by a user to define a format, i.e., the layout of fields for a tag, label or the like. When a user selects various printer types for which a format is to be generated, the format editor automatically determines the intersection of the sets of printer function options for each of the selected printer types to create a common set of printer function options. Thereafter, the format editor prompts the user to select only those printer function options supported by the selected printer types for the format as indicated in the common printer function option set.

20 Claims, 11 Drawing Sheets

BARCODE IDENTIFICATION SYSTEM FORMAT EDITOR

TECHNICAL FIELD

The present invention is directed to a barcode identification system format editor for generating and modifying formats for printing information on tags, labels or the like by a number of barcode printers of various, incompatible types; and more particularly to such a format editor for aiding a user in creating a single format for multiple incompatible printers.

BACKGROUND OF THE INVENTION

Barcode identification systems having a number of barcode printers are known for printing jobs that include barcodes and associated alphanumeric characters on a web of record members such as tags, labels and the like. Typically barcode printers can print jobs in a limited number of formats. The format of a tag or label defines the type of data field, i.e., barcode fields, alpha fields, numeric fields, etc.; the position of the fields on the tag/label; the font used to print alphanumeric fields if more than one font is available; magnification and rotation factors if any; etc. as is well known to those in the art of barcode identification systems. Printers of various types typically have different format options. Because of the differences in printer format options, a job having a format capable of printing on one printer may not be able to print on a printer of a different type.

Typical barcode printer systems having a number of printers, typically require that the printers of the system be of the same family such that the printers are compatible in that they communicate in the same language and are capable of printing data in the same formats. One known barcode information system utilizes a number of incompatible barcode printers as well as compatible barcode printers. As used herein, incompatible printers refers to printers that do not communicate in the same language and/or do not have substantially the same format options. In this known barcode identification system, a different queue is provided for each type of printer in the system. Although incompatible printers cannot be assigned to the same queue, each queue can have assigned thereto a number of printers of the same family, i.e., compatible printers. In this system, formats are manually created by entering format information without being prompted to by the system. Each format is created specifically for a queue so that it will be valid for the printers attached thereto.

Another known barcode printer will prompt a user to create a format for a single printer type. This system however cannot prompt a user to create a format for multiple printers of different types, i.e., printers that are incompatible. Therefore, if a job is to be printed on a number of different incompatible printers, different formats must be created for each of those printers in order for the printers to print the same job.

SUMMARY OF THE INVENTION

In accordance with the present invention, the disadvantages of prior barcode identification system format editors have been overcome. The barcode identification system format editor of the present invention allows a single format to be created for multiple, incompatible printers so that a job having a multi-printer format may be printed on incompatible printers without the need to create a different format for each of those incompatible printers.

More particularly, the barcode identification system of the present invention utilizes a number of barcode printers of various types for printing on a web of record members such as tags, labels or the like. Each type of barcode printer has an associated set of printer function options selectable by a user to define a layout of fields for a record member. Each different printer type has an associated printer definition file for storing the set of printer function options for that printer type. When the user creates or modifies a format, the user selects the various printer types for which the format is to be generated. In response thereto, the format editor automatically determines the intersection of the sets of printer function options for the selected printer types in order to create a set of printer function options common to each of the selected printer types. Thereafter, the format editor prompts the user to select printer function options only from the common printer function option set so as to aid the user in defining a single record member layout for the selected plurality of printer types.

The system of the present invention allows a user to change the selected printer types for a previously generated format. In response to a change in selected printer types, the format editor creates a new set of common printer function options and further determines whether information defining the format as previously generated is valid for the new set of common printer function options. Any conflicts between the previously created format and the newly selected printers for printing that format will be displayed to the user so that the user can make the necessary changes thereto.

The format editor of the present invention further allows test prints of a given format to be made using dummy data. The format editor also allows global cost codes to be generated for the various incompatible printers used in the barcode identification system.

These and other objects, advantages and novel features of the present invention, as well as details of an illustrated embodiment thereof will be more fully understood from the following description and from the drawing.

DESCRIPTION OF THE PREFERRED EMBODIMENT

Figure 1:
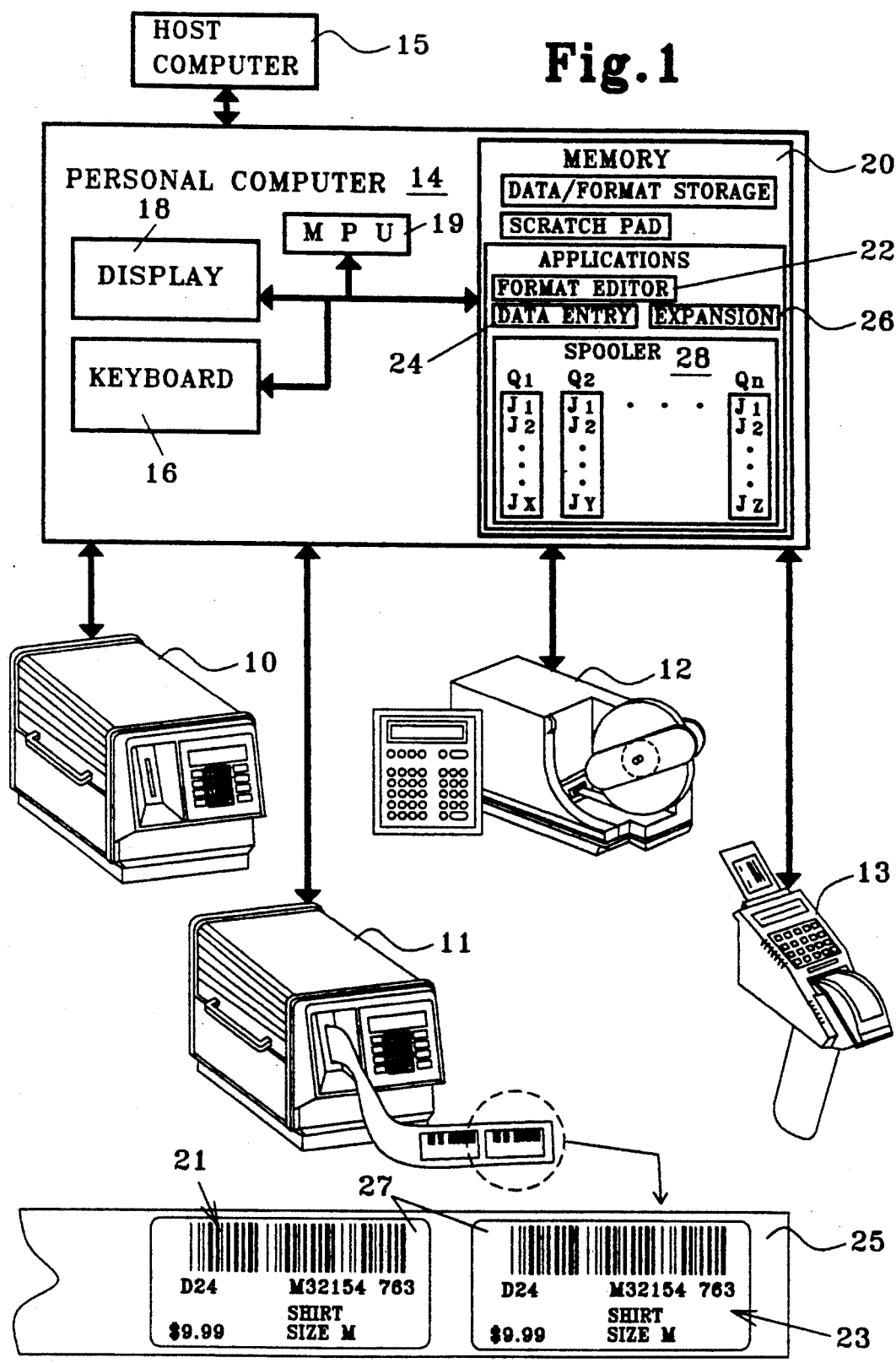
FIG. 1 is a block diagram of the barcode identification system of the present invention illustrating a number of printers in perspective view.

The barcode information system of the present invention as shown in FIG. 1 allows a user to print, via a number of barcode printers 10, 11, 12 and 13, jobs entered into the system via a personal computer 4 hereinafter referred to as the P.C. 14. Each of the printers 10-13 is connected to the P.C. 14 through a RS 232 interface or the like. The system of the present invention also allows a host computer 5 to interface with the barcode printers 10-13 via P.C. 14 so that print jobs or portions thereof can originate with the host computer. The P.C. 14 includes a keyboard 16 for entering information into the system in order to create a job to be printed. Although not shown, a mouse or other suitable input device may also be used. The P.C. 14 includes a display 18 to prompt the user to enter particular information and to provide feedback to the user regarding the operation of the system. The P.C. 14 includes a microprocessor 19 that operates in accordance with application software stored in a memory 20 to create the information necessary to print a job on one or more of the printers 10-13. It is noted that the four printers depicted in FIG. 1 are for illustrative purposes only. Up to 32 printers can actually be connected to the P.C. 14 for simultaneous operation of the printers.

The barcode printers of the system may be compatible such as printers 10 and 11 in that these printers speak the same language and have the same user selectable format options defining the way in which barcode data 21 and related alphanumeric data 23 may be printed on a web 25 of record members 27 such as tags, labels or the like. Alternatively, the barcode printers of the system may be incompatible such as printers 10, 12 and 13 in that the printers do not speak the same language and do not have the same user selectable format options. In accordance with the present invention, however, the user can define multi-printer formats for a job to allow a job to be printed on any one of the incompatible printers for which the job was created.

To create a typical barcode print job, the user first creates a format for the job utilizing a format editor routine 22. The format editor allows a user to create a single format for a number of incompatible printers. Once the user selects the printers for a format to be created or modified, the format editor automatically prompts the user to create a multi-printer format by providing to the user for his selection only those format options that are common to all of the designated printers. Thus the multi-printer format created is compatible with each of the otherwise incompatible printers. As used herein, the format editor refers to the microprocessor 19 operating in accordance with the format editor software routines described in detail below.

After a format for one or more print jobs is created, a user may run a data entry routine 24 to interface with the user, prompting the user to select the format to be utilized for a job and to enter data for the job. A suitable data entry routine is depicted in U.S. patent application Ser. No. 07-783,770 entitled Barcode Identification System, filed concurrently herewith, which application is assigned to the assignee of the present invention and incorporated herein by reference. During the operation of the data entry routine 24, the user enters a job name, the system automatically assigning a job identification number. The user also enters a file name for the job, the user selecting a format for the job when the job file is opened. The user further enters information identifying the destination queue for the job as well as the number of times that the user wants to print a given job. During the data entry routine 24, the user selects the priority of the job and also whether the job is to be deleted from a disk memory after printing or not.

When a job is ready to be printed as indicated by a user via the keyboard 16, an expansion routine 26 combines the data entered during the operation of the data entry routine 24 with the designated format generated by the format editor 22 and sends a print command to a spooler 28. When the spooler 28 receives the print command for a job, the spooler looks at the destination queue designated in the print command and determines whether there is a printer assigned to the designated queue that is capable of printing the job. The spooler 28 may be configured by a user to assign one printer to one queue; multiple printers to one queue or multiple queues to one printer. Each printer assigned to a given queue may not be capable of printing every job listed in that queue.

When the spooler 28 receives a print command for a job the spooler determines from the information entered during the configuration of the spooler whether there is one printer assigned to the destination queue that is of a type listed in the job's print command as being capable of printing the job's format. If so, the spooler 28 adds the job to the designated destination queue in a position associated with the job's designated priority. The spooler 28 monitors the status of each of the printers 10-13 to determine when a given printer is ready to receive a job for printing. When the spooler finds a printer that is ready to print a job, the spooler searches each of the queues for the highest priority job capable of being printed on the same type of printer as the ready printer. Thereafter, the spooler transfers the highest priority job that is found to the ready printer for U.S. patent application Ser. No. 97-783,765 entitled Barcode Identification System Spooler, filed concurrently herewith, which application is assigned to the assignee of the present invention and incorporated herein by reference.

In accordance with the present invention a printer definition file is stored for each of the different printer types of the system. Each printer definition file contains the information necessary for the system to operate on all aspects of the printer. For example, the printer definition file contains information defining the types of barcodes supported by the particular printer type as well as the barcode densities. The printer definition file also contains information regarding the size of the stock that the printer type can handle; and information regarding whether the printer can cut, print batch separators, handle multiple parts, etc. A printer definition file also contains information defining the types of fields supported, how many fields and the source of data for the fields as well as supported characters and field rotations. The printer definition file further identifies the fonts and font densities supported by the printer type. The format editor uses the printer definition files to determine what options to allow the user to select for a format being defined. The printer definition file is also used when a user changes the selected printers for a previously created format to insure that the format previously defined is compatible with the newly selected printer types.

More particularly, the printer definition file may be broken into eight sections including a header section, field general section, text section, barcode section, line section, box section, graphic section, and translator section. The header section contains parameters designating stock size and type, valid storage devices for the printer, selectable user units, valid printing areas, knife support, feed modes, batch separators, print head density and miscellaneous printer defaults. Certain of the parameters might be defined in terms of ranges. For example, in order to define the size of the stock, a stock length parameter and width parameter is included in the header section. Each of these parameters includes a minimum value, maximum value and a default value. Another parameter might define the various support devices of the printer such as a fixed ROM, memory card, RAM, etc. Other parameters might define features or functions that may be enabled or disabled.

An on line section of the printer definition file contains parameters controlling the header parameters that are unique between on line support for the printer 10, 11, 12, 13 and off line support for the printer 10, 11, 12, 13. The field general section of the printer definition file includes parameters defining options that can apply both to barcode fields and text fields. These options include rotations, data formatting options, etc. The text section of the printer definition file includes options that apply only to text fields. Such options might designate character rotation, magnification and font support for example. The barcode section of the printer definition file contains a listing of all barcodes that are supported for the printer type including the barcode densities, minimum length, maximum length as well as the type of human readable characters that can be associated with the barcode. A line section of the printer definition file contains a listing of the kinds of lines that are supported by the printer type. More particularly, the minimum and maximum line widths are specified herein as well as the line angles supported, etc. The box section of the printer definition file contains a listing of the box support for the printer type including the minimum and maximum box widths, etc. The graphic section of the printer definition file contains a listing of the graphic support for the printer type. Finally, the translator section of the printer definition file contains the print driver support for the printer type. Once the printer definition files for each of the various printer types of the system are set up and stored in the memory 20, a user can generate a single format useable by a number of incompatible printers as discussed below.

Figure 2:
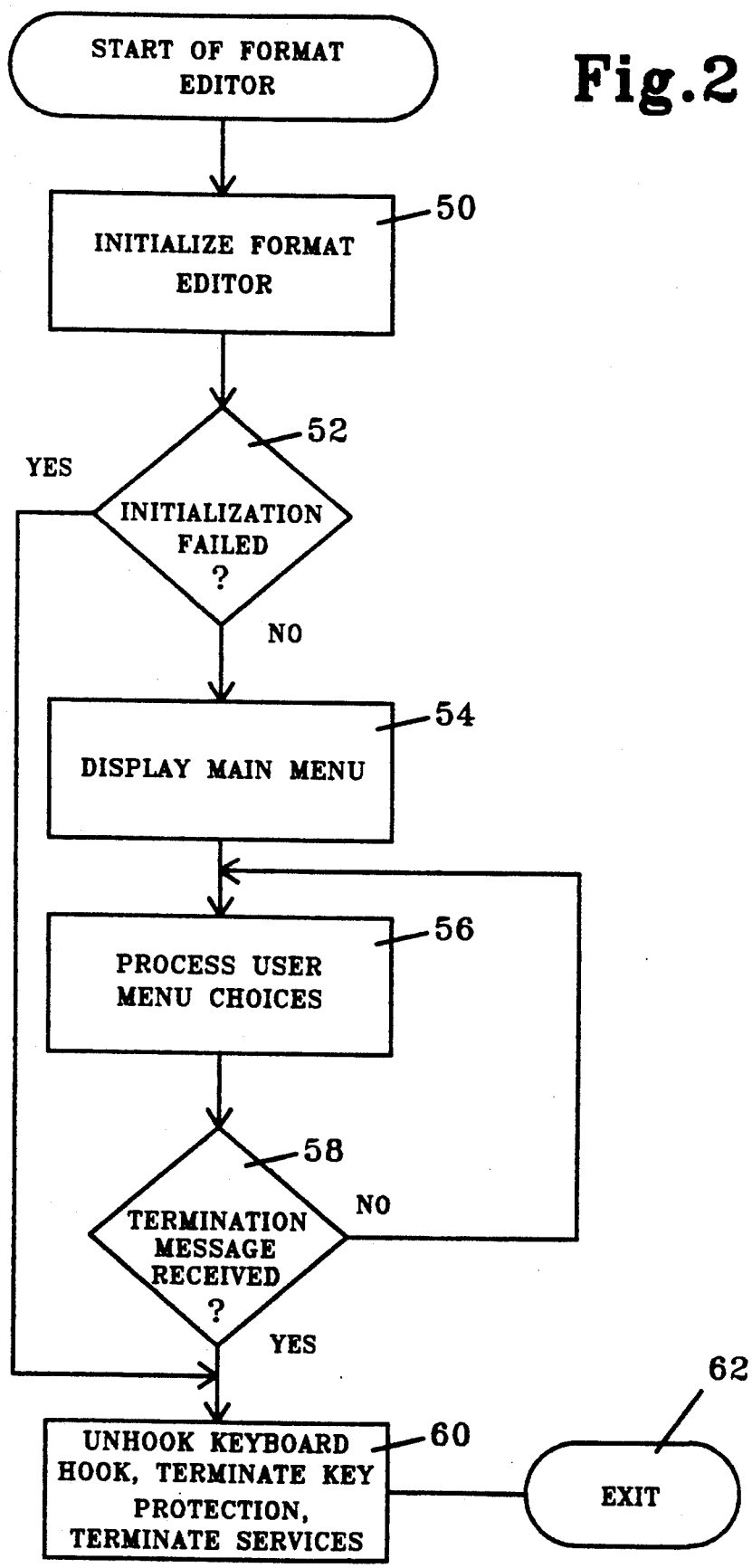
FIG. 2 is a flow chart illustrating a Main Format Editor software routine of the present invention.

FIG. 2 illustrates the main format editor routine. Upon startup, the microprocessor 19 initializes the format editor. If the initialization has failed as determined by the microprocessor 19 at block 52, the microprocessor proceeds to block 60 to unhook the keyboard 16, terminate key protection and terminate the various services whereupon the microprocessor exits at block 62. If however, the initialization of the format editor is successful, the microprocessor 19 controls the display 18 to depict a main menu at block 54. At block 56 the microprocessor 19 processes any user selected menu choices and exits if a termination message has been received as determined at block 58.

Figure 3:
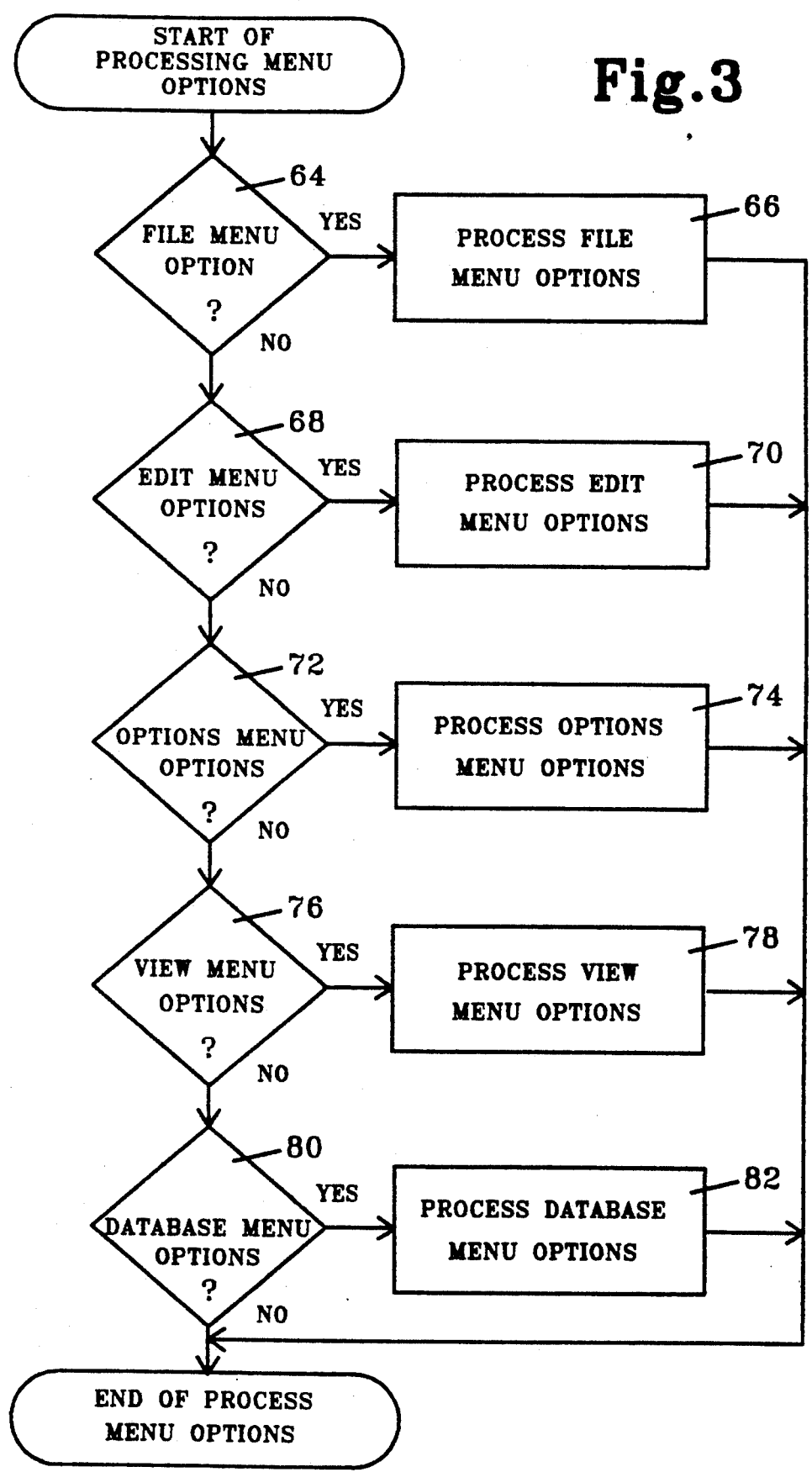
FIG. 3 is a flow chart illustrating a Main Menu Processing subroutine of the format editor.

The main menu includes five user selectable options: file, edit, option, view and data base as depicted in FIG. 3. When the microprocessor 19 detects a main menu option selection at block 56, the microprocessor enters the Main Menu Processing subroutine depicted in FIG. 3. More particularly, at block 64, the microprocessor 19 determines whether the file menu option has been selected by the user and if so proceeds to block 66 to process the file menu option. Under the file menu option the user can select a number of file options such as (1) new, (2) open, (3) close, (4) save, (5) save as, (6) supply set up, (7) printer set up, (9) download, (9) test print, (10) spooler set up, (11) exit, and (12) 1, 2, 3. The new file option allows a user to create a new format as discussed in detail below. The open file options allows a user to open an existing format so that the format may be modified. The close file option allows a user to save and close a currently opened format; whereas, the save file option allows a user to save a format. The save as file option allows a user to save a format with a different format name. The supply set up file option allows a user to change the size of the printer stock or supply and the measurement units to be utilized. The printer set up file option allows a user to change the selected printers for a given format. The download file option allows a user to send a format to a printer for off line usage. The test print option allows a user to send a format to a printer with dummy data in the field positions The spooler set up file option allows a user to select a queue to send a format to. The exit file option allows a user to terminate the format editor routine. Finally, the 1, 2, 3 file option allows a user to list the three formats most recently accessed by the user.

If the file menu option 64 was not selected, the microprocessor 19 proceeds to block 68 to determine whether the edit menu options were selected. If so, the microprocessor 19 proceeds to block 70 to process the edit menu options. The edit menu options include: (1) an add text option, (2) add barcode option, (3) add data option, (4) add line option, (5) add box option, (6) add graphic option, (7) delete option, (8) a modify edit option and (9) a reorder edit option. The edit menu options allow a user to add field parameters to a newly created format or to modify the field parameters of a previously created format. More particularly, the add text edit option allows a user to add a new text field to a given format. The add barcode edit option allows a user to add a new barcode field to a given format. The add data edit option allows a user to add a new data field to a given format and the add line edit option allows a user to add a new line field to the format. The add box edit option allows a user to add a new box field to the given format whereas the add graphic edit option allows a user to add a new graphic field to the format. The delete edit option allows the user to delete a field from a format. The modify edit option allows a user to change a previously defined field and the reorder edit option allows a user to change the order of fields in a format. If the microprocessor 19 determines at block 68 that an edit menu option has not been selected, the microprocessor proceeds to block 72.

At block 72, the microprocessor determines whether the options menu option has been selected and if so, the microprocessor at block 74 processes the selected options menu option. From the options menu, the user can select (1) a check digits option, (2) a cost codes option, (3) a validate on open option, (4) a validate on close option, (5) an auto validation option and (6) a validate now option. The check digits option allows a user to manage global check digits; whereas the cost codes option allows a user to manage global cost codes. The validate on open option allows a user to choose to enable or disable the validation routine when opening a format. The validate on close option allows a user to enable or disable the validation routine when closing a format. Further, the auto validation option allows a user to enable or disable field positioning validation and the validate now option allows a user to force a validation on a current format. If the microprocessor determines at block 72 that the options menu has not been selected by a user, the microprocessor 19 proceeds to block 76.

At block 76 the microprocessor determines whether a view menu option has been selected and if so, the microprocessor proceeds to block 78 to process the selected view menu option. The view menu includes the following options: (1) a simulated tag option, (2) a field names option, (3) a field data option, (4) a field templates option, (5) a field boundary option and (6) a status option. The simulated tag option of the view menu allows a user to enable or disable the graphical display of a record member. The field names option causes the data displayed for fields to be field names; whereas the field data option causes the data displayed for fields to be dummy data. The field templates option causes the data displayed for fields to be an input pattern or restrictions for the field. A field boundary option allows a user to choose to enable or disable a red box around fields and unusable sections of the record member. The status option under the view menu allows a user to show or not to show the status box. If the microprocessor 19 determines at block 76 that a view menu option has not been selected, the microprocessor 19 proceeds to block 80 to determine whether the database menu option has been selected.

If the database menu option has been selected, the microprocessor 19 proceeds to block 81 to process the selected database menu options. The database menu options include a table option that allows a user to select the database files to use for a given format. The database menu also includes a search fields option that allows a user to select which fields out of selected databases to use as a prompt field for information from the database.

Figure 4A:
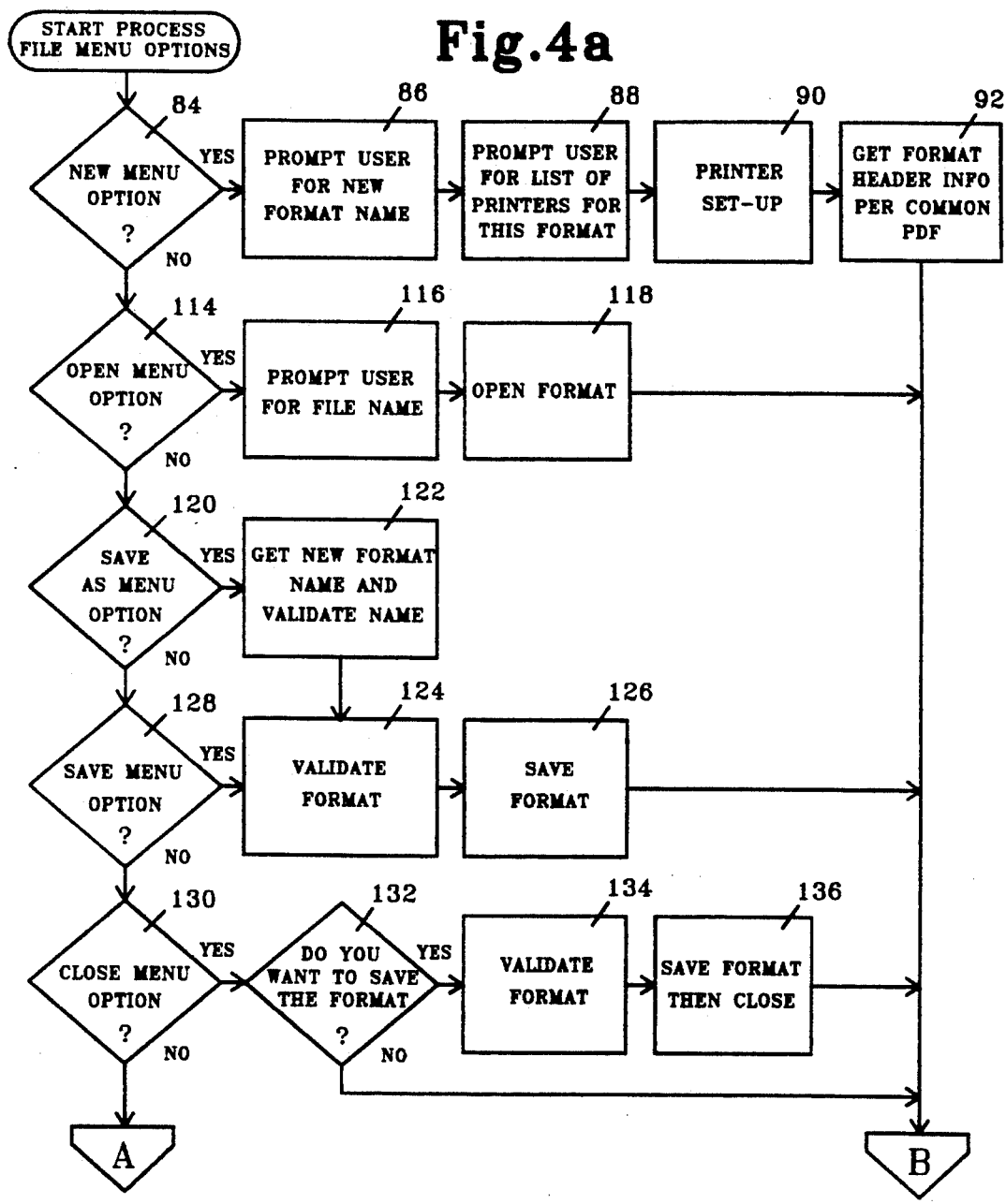
FIGS. 4A, 4B and 4C form a flow chart illustrating the Process File Menu software subroutine of the format editor.
Figure 4B:
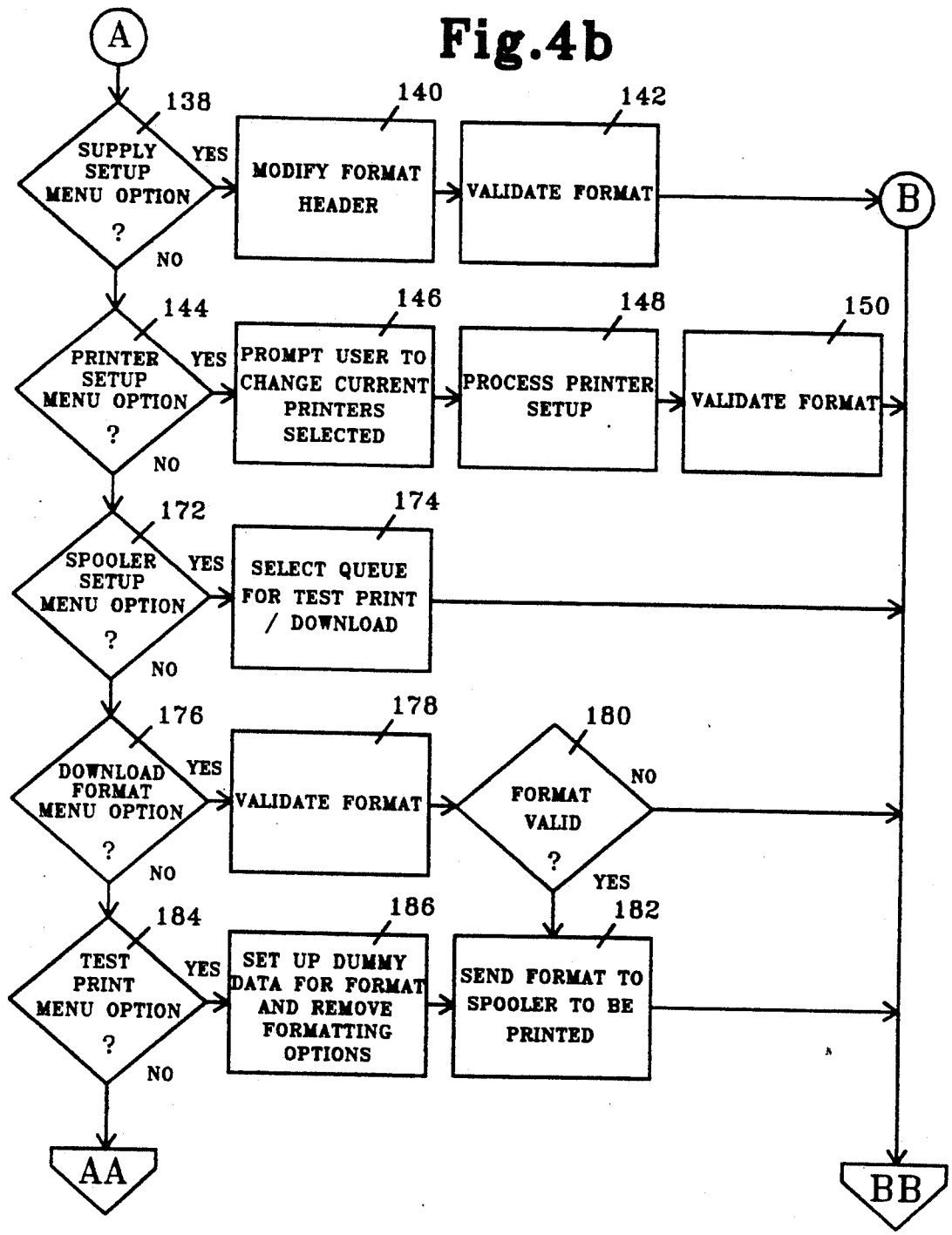
Figure 4C:
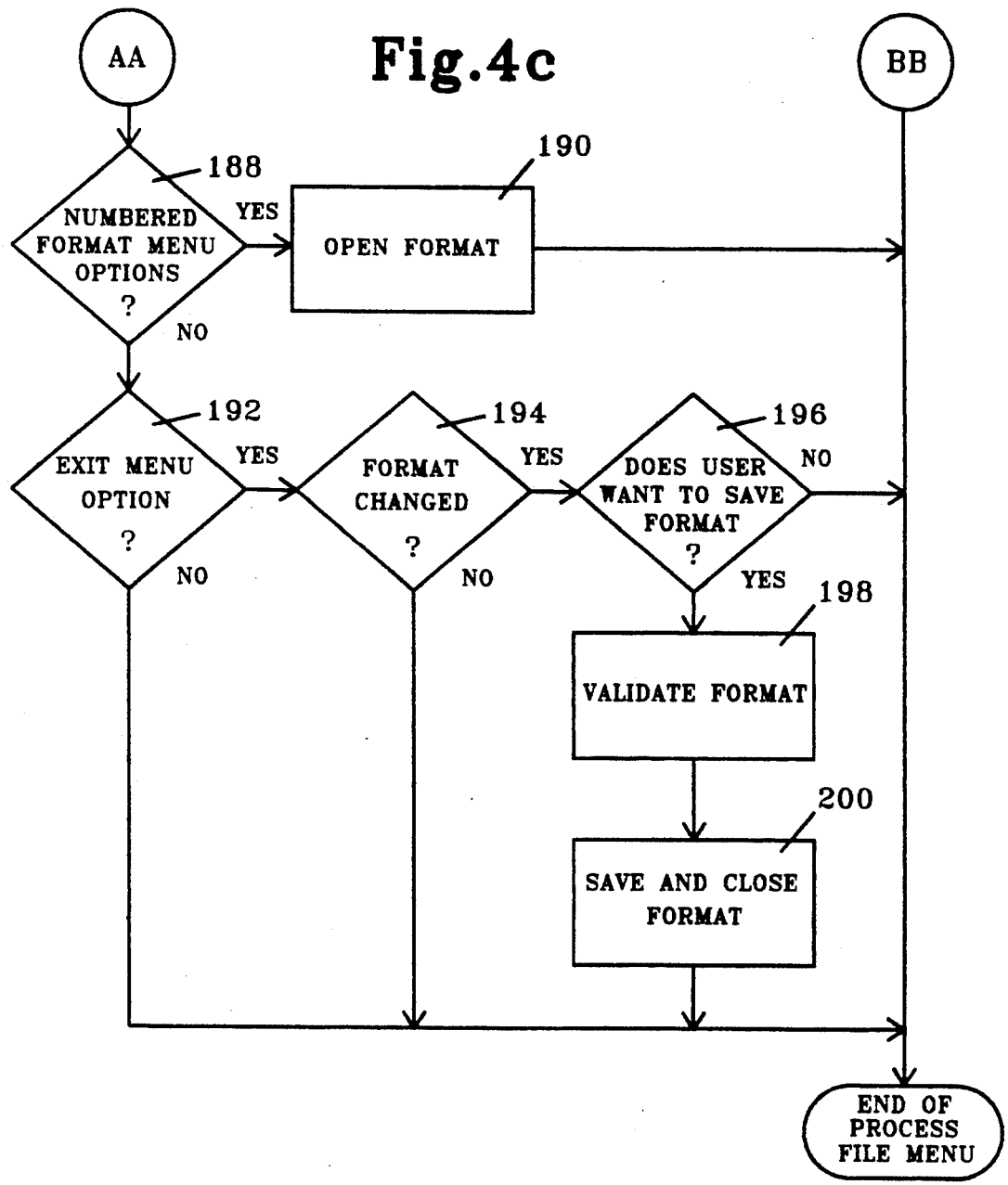

The microprocessor 19 processes a selected file menu option in accordance with the flow chart depicted in FIGS. 4A-C. The new file menu option allows a user to create a multi-printer format wherein the format editor generates a common printer definition file from the individual printer definition files associated with the user selected printer types. After the common printer definition file for the format is created, the format editor prompts the user to enter format header information, i.e., format header options that are within the common printer definition file. After the user selects the desired format header options from the common printer definition file, the user can select the edit menu option as determined by the microprocessor at block 68 to allow field parameter information to be added to the format header information in order to create a format packet.

More particularly, upon entering the process file menu routine as depicted in FIG. 4A, the microprocessor 19 at block 84 determines whether the new menu option has been selected by a user in order to create a new format. If so, the microprocessor 19 proceeds to block 86 to prompt the user via the display 18 to enter a new format name. Thereafter, at block 88 the microprocessor 19 prompts the user via the display 18 to list the various printer types for which the format is to be created. The microprocessor 19 then continues to block 90 to implement the printer set up routine depicted in FIG. 5. in order to generate the common printer definition file for the multi-printer format being created.

Figure 5:
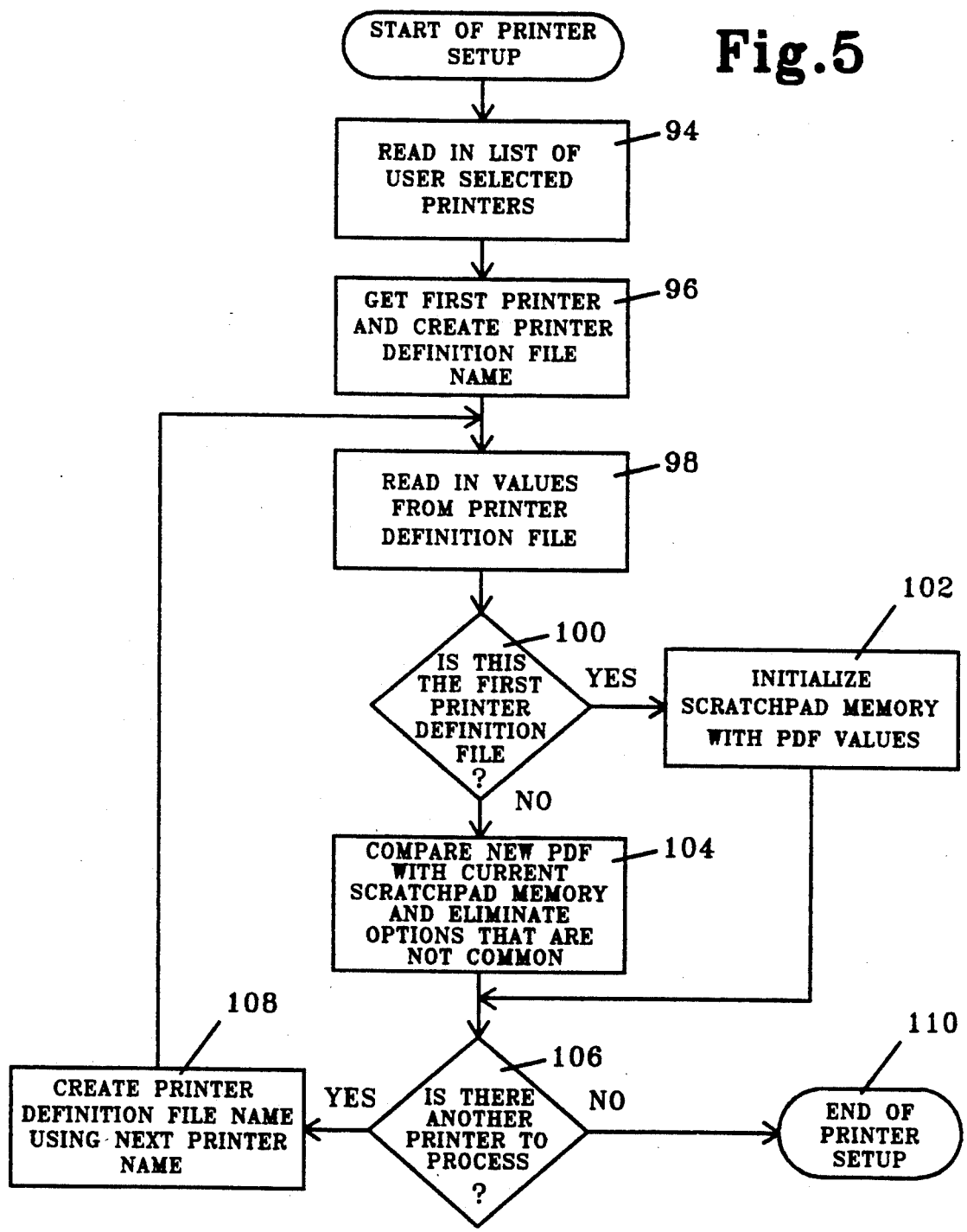
FIG. 5 is a flow chart illustrating the Printer Set Up software subroutine of the format editor.

As shown in FIG. 5, upon entering the printer set up routine, the microprocessor 19 at block 94 reads in the list of printers selected by the user for the format via the keyboard 16. At blocks 96 and 98 the microprocessor gets the printer definition file for the first printer type selected by the user and reads in the printer definition file values. At block 100 the microprocessor 19 determines whether this is the first printer definition file and if so proceeds to block 102 to store the printer definition file in a scratch pad area of the memory 20. Thereafter, the microprocessor proceeds to block 106 to determine whether there is another printer type to be processed and if so, the microprocessor 19 proceeds to block 108. At block 108 the microprocessor 19 creates a printer definition file name using the next printer type selected by the user and at block 98 the microprocessor reads in the printer definition file for that printer type. The microprocessor at block 100 now determines that this is not the first printer definition file and proceeds to block 104. At block 104 the microprocessor 19 compares the new printer definition file with the current printer definition file stored in the scratch pad area of the memory 20. The microprocessor then eliminates those printer features i.e printer function options that are not common to both printer definition files.

More particularly, at block 104, the microprocessor 19 modifies the printer definition file stored in the scratch pad area of the memory 20 to represent the intersection of the set of values and features or functions defined in the new printer definition file and the set of those values and features or functions defined in the printer definition file currently stored in the scratch pad area of the memory 20. For printer function options that represent a range of user selectable values having a minimum value and a maximum value, the format editor generates a common function option set by setting the common function option's maximum value equal to the lowest maximum value in either of the printer definition files and by setting the common function option's minimum value equal to the greatest minimum value stored in either of the two printer definition files being compared at block 104. For example, one function option designates the minimum and maximum stock lengths permitted for a given printer type. The microprocessor 19 at block 104 compares the minimum stock length for the new printer definition file and the minimum stock length stored in the printer definition file in the scratch pad memory and replaces the minimum stock length stored in the scratch pad memory with the greater of the two compared minimum stock length values. Similarly, the microprocessor compares the maximum stock length values for the stock length function option specified in the new printer definition file and that stored in the printer definition file in the scratch pad area of memory 20. The microprocessor then replaces the maximum stock length value stored in the printer definition file in the scratch pad memory with the lowest maximum stock length value of the two values being compared. Thus, where a function option is defined as a range, the common printer definition file being generated in the scratch pad area of the memory 20 represents the intersection of the ranges specified for that function option in each of the printer definition files for the printer types selected by the user for the format being created.

The microprocessor continues to modify the common printer definition file being created in the scratch pad area of the memory 20 until each of the printer definition files for the selected printer types has been compared to the common printer definition file so that the printer definition file in the memory 20 now represents the intersection of the printer definition files for all of the selected printer types. When there is no further printer definition file to process, the microprocessor exits the printer set up routine at block 110.

After generating the common printer definition file for the printer types selected by the user at block 88, the microprocessor proceeds from block 90 to block 92. At block 92 the microprocessor 19 prompts the user via display 18 to select various format options from a format header option set which is essentially a subset of the common printer definition file created at block 90. The format header information retrieved from the user via the keyboard 16 includes the size of the stock, i.e., the stock length, width and number of parts as well as the measurement units which, for example, may be either inches or centimeters. The format header information also includes information regarding the feed mode of the printer as well as cut and take up modes and batch separators if any. The format header information further includes the destination for the format when it is created such as RAM, a memory card or temporary memory. After storing the format header option selections entered by the user, the microprocessor 19 exits the process file menu routine at block 112.

If the microprocessor 19 determines that the open menu option has been selected, the microprocessor proceeds to block 116 to prompt the user for the file name that is to be opened. Thereafter, at block 118 the microprocessor retrieves the format packet identified by the user at block 116 and stores it in resident memory so that the user can make changes to the format packet.

If the microprocessor determines that the Save As menu option has been selected, the microprocessor proceeds from block 120 to block 122 to retrieve from the user the new format name for the specified format. At block 122 the microprocessor also validates the format name. From block 122, the microprocessor proceeds to block 124 to validate the format as described below in detail with respect to FIG. 6 and thereafter proceeds to block 126 to save the validated format. Upon determining at block 128 that the user has selected the save menu option, the microprocessor proceeds to block 124 to validate the format that the user wants to save and at block 126 the microprocessor 19 saves the format.

At a block 130, the microprocessor determines whether the close menu option has been selected by the user and if so the microprocessor proceeds to block 132. At block 132 the microprocessor prompts the user regarding whether he wants to save the format and if so, the microprocessor proceeds to block 134 to validate the format and thereafter at block 136 the microprocessor 19 saves the format and closes the currently opened format. At block 138, the microprocessor 19 determines whether the supply set up menu option has been selected by the user and if so, the microprocessor proceeds to block 140. At block 140, the user is prompted by the microprocessor via the display 1B to enter the new stock size and measurement units. It is noted, that the other format header information may also be modified at block 140. Thereafter, the microprocessor at block 142 validates the format.

Upon determining at block 144 that the user has selected the printer set up menu option, the microprocessor 19 at block 146 prompts the user to change the current printers selected for a given format. After the user enters the selected printer types for the previously created format, the microprocessor 19 proceeds to block 148 to implement the printer set up routine as discussed above. In the printer set up routine, the microprocessor 19 generates a new common printer definition file for the previously created format. Thereafter, the microprocessor 19 proceeds to block 150 to validate the format in accordance with the routine depicted in FIG. 6.

Figure 6:
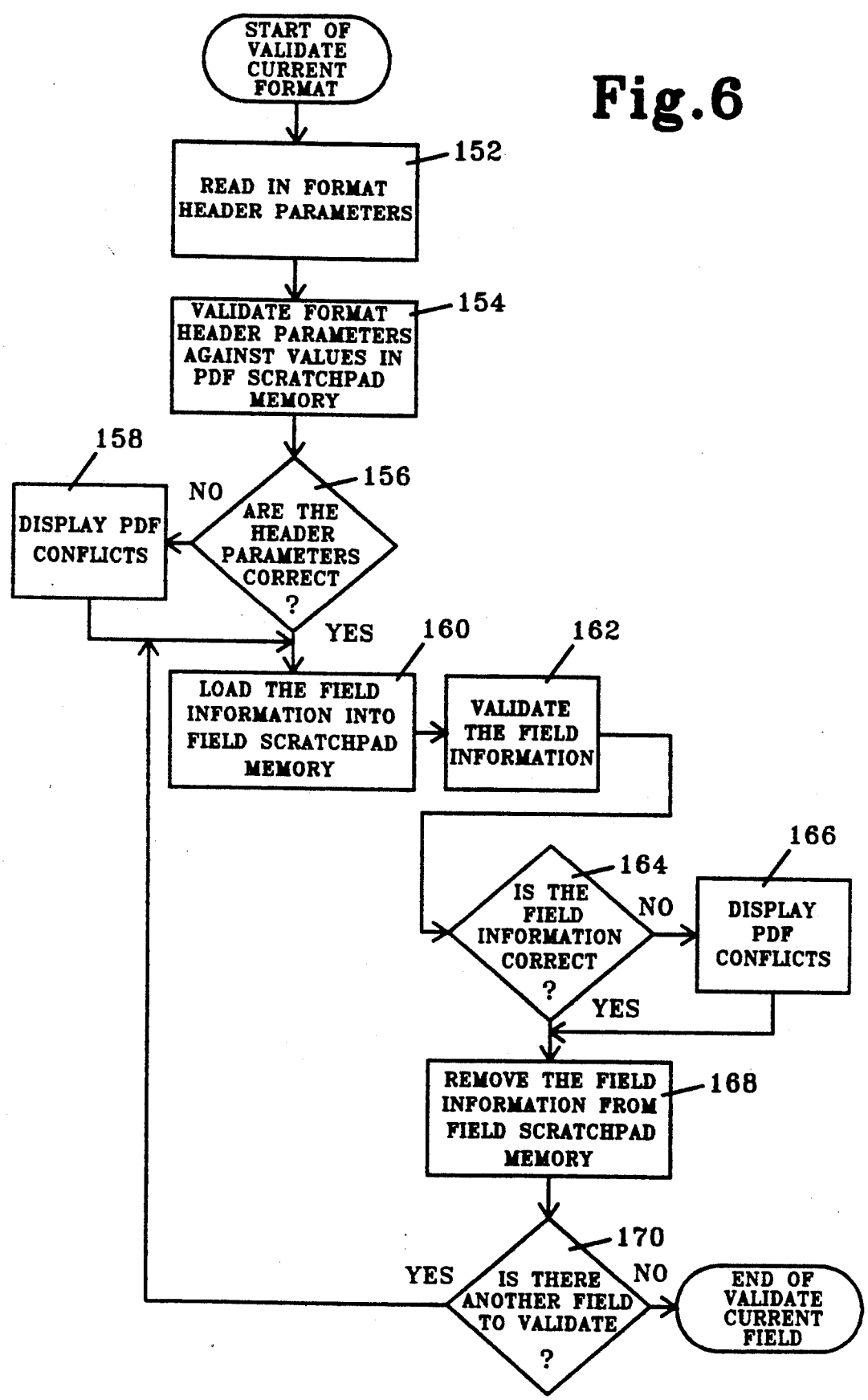
FIG. 6 is a flow chart illustrating the Validate Current Format software subroutine of the format editor.

As shown in FIG. 6, upon entering the validate format routine, the microprocessor at block 152 reads in the format header parameters for the format previously created by the user. Thereafter, at block 154, the microprocessor validates the format header parameters against values stored in the scratch pad area of the memory 20 for the common definition file. At block 156 the microprocessor 19 determines whether the header parameters previously entered for the format are still valid in view of the user's new printer selections and in particular in view of the common printer definition file. If the header parameters are not valid, as determined by the microprocessor at block 156, the microprocessor proceeds to block 158 to cause the display 18 to depict the conflicts. More particularly, the microprocessor 19 at block 158 causes the display to indicate to the user the various format header parameters that are not correct in view of the newly created common printer definition file. From blocks 158 and 156, the microprocessor proceeds to block 160 to load the field parameters previously entered by the user for the format into a scratch pad area of the memory 20. Thereafter, at block 162 the microprocessor 19 validates these field parameters against the information stored in the common printer definition file that was created for the user's newly selected printers. At block 166, the microprocessor causes the display 18 to depict any conflicts between the field parameters and the newly created printer definition file. From blocks 164 and 166, the microprocessor 19 proceeds to block 168 to remove the field parameters from the scratch pad portion of the memory 20 and at block 170 determines whether there is another field to validate or not.

Returning to FIG. 4B, the microprocessor 19 at block 172 determines whether the spooler set up menu option has been selected by the user and if so, the microprocessor proceeds to block 174 to select a queue for a test print or the downloading of a format to the spooler to be printed. If the microprocessor determines at block 176 that the user has selected the download format menu option, the microprocessor proceeds to block 178 to implement the validate format routine depicted in FIG. 6. Thereafter, the microprocessor determines at block 180 whether the format is valid and if so, the microprocessor at block 182 sends the format packet to the spooler for printing. If the microprocessor determines at block 184 that the test print option has been selected by a user, the microprocessor at block 186 sets up dummy data for the format and removes formatting options. Thereafter, at block 182 the microprocessor sends the format to the Spooler for a test print.

If the microprocessor determines at block 188 that the 1, 2, 3 file menu option has been selected, the microprocessor at block 190 implements the open format routine as discussed above with respect to block 118. The microprocessor at block 192 determines whether the exit menu option has been selected and if so, the microprocessor proceeds to block 194 to determine whether a format has been changed. If a format has been changed, the microprocessor at block 196 determines whether the user wants to save the changed format and if so, the microprocessor proceeds to block 198. At block 198 the microprocessor implements the validate format routine depicted in FIG. 6 and at block 200 the microprocessor 19 saves and closes the format.

Figure 7:
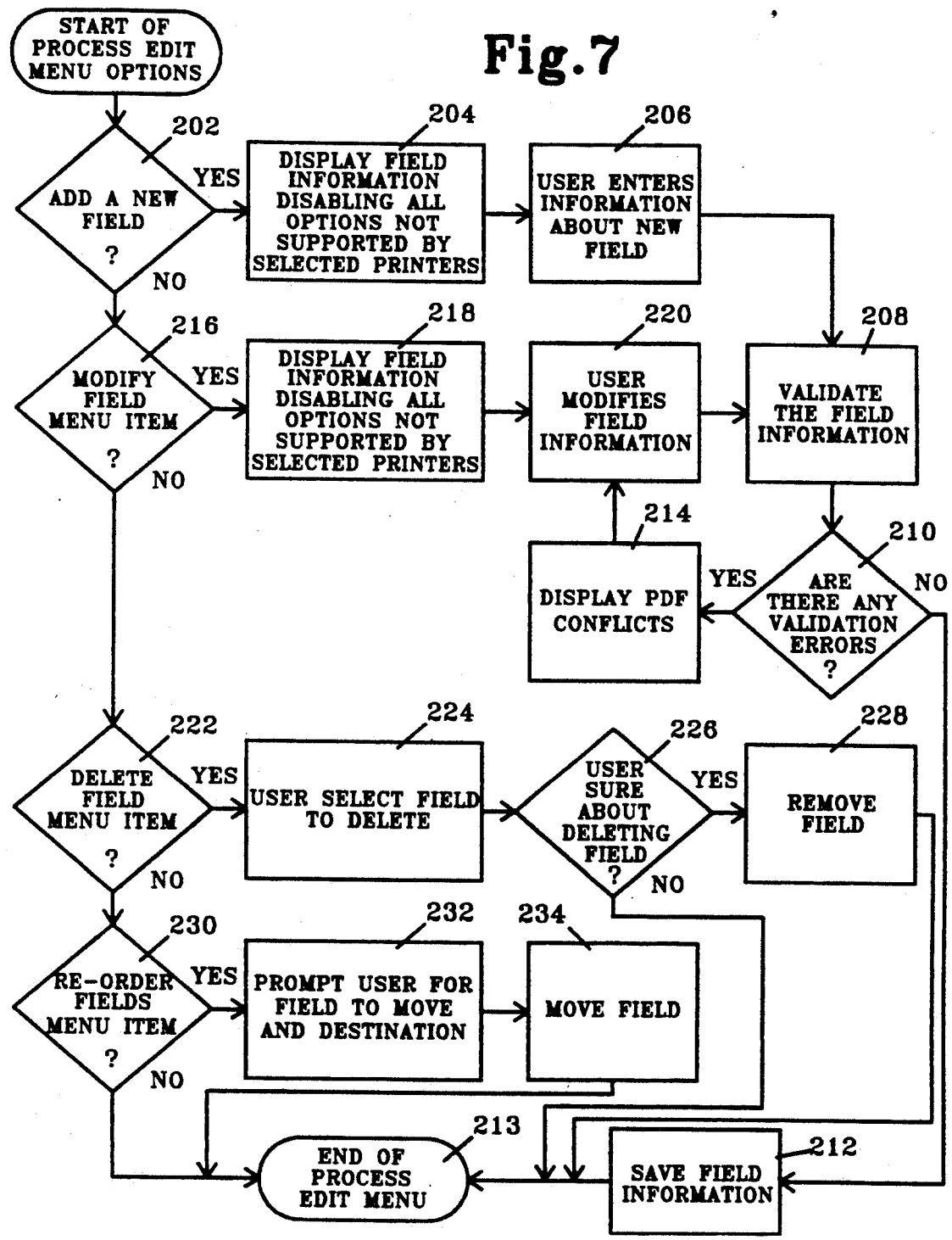
FIG. 7 is a flow chart illustrating the Process Edit Menu software subroutine of the format editor.

In order to add field parameters to the format header parameters generated at block 92, the user selects the edit menu option depicted in FIG. 7. On entering the process edit menu routine, the microprocessor at block 202 determines whether a new field is to be added to the format. If so, the microprocessor at block 204 displays field information options for only those printers selected by the user for the format as indicated in the common printer definition file. At block 206 the microprocessor 19 waits for the user to enter information regarding the new field. After the user enters the information regarding the new field, the microprocessor 19 at block 208 validates the field information. If the microprocessor determines at block 210 that there are no validation errors, the microprocessor at block 212 saves the field information and thereafter exits the process edit menu at block 213.

If the microprocessor determines at block 216 that the modify field menu option has been selected by a user, the microprocessor at block 218 displays only those field feature or function options supported by the printers selected by the user for the format as determined by the common printer definition file. At block 220 the microprocessor waits for the user to modify the field information. Thereafter at block 208 the microprocessor validates the field information entered by the user. At block 210 the microprocessor determines whether there are any validation errors and if so, the microprocessor controls the display 18 to indicate to the user any conflicts between the entered field information and the common printer definition file.

If the microprocessor determines at block 222 that the delete field menu item has been selected, the microprocessor proceeds to block 224. At block 224 the microprocessor waits for the user to select a field to delete. At block 226 the microprocessor prompts the user via the display 18 to confirm whether the field is to be deleted and if so, the microprocessor at block 228 removes the field from the format. If the microprocessor determines at block 230 that the reorder fields menu option has been selected, at block 232 the microprocessor 19 prompts the user via the display 18 to enter the field to be moved and to enter the destination of that field. Upon receiving the name of the field to be moved and its destination, the microprocessor at block 234 moves the field.

Figure 8A:
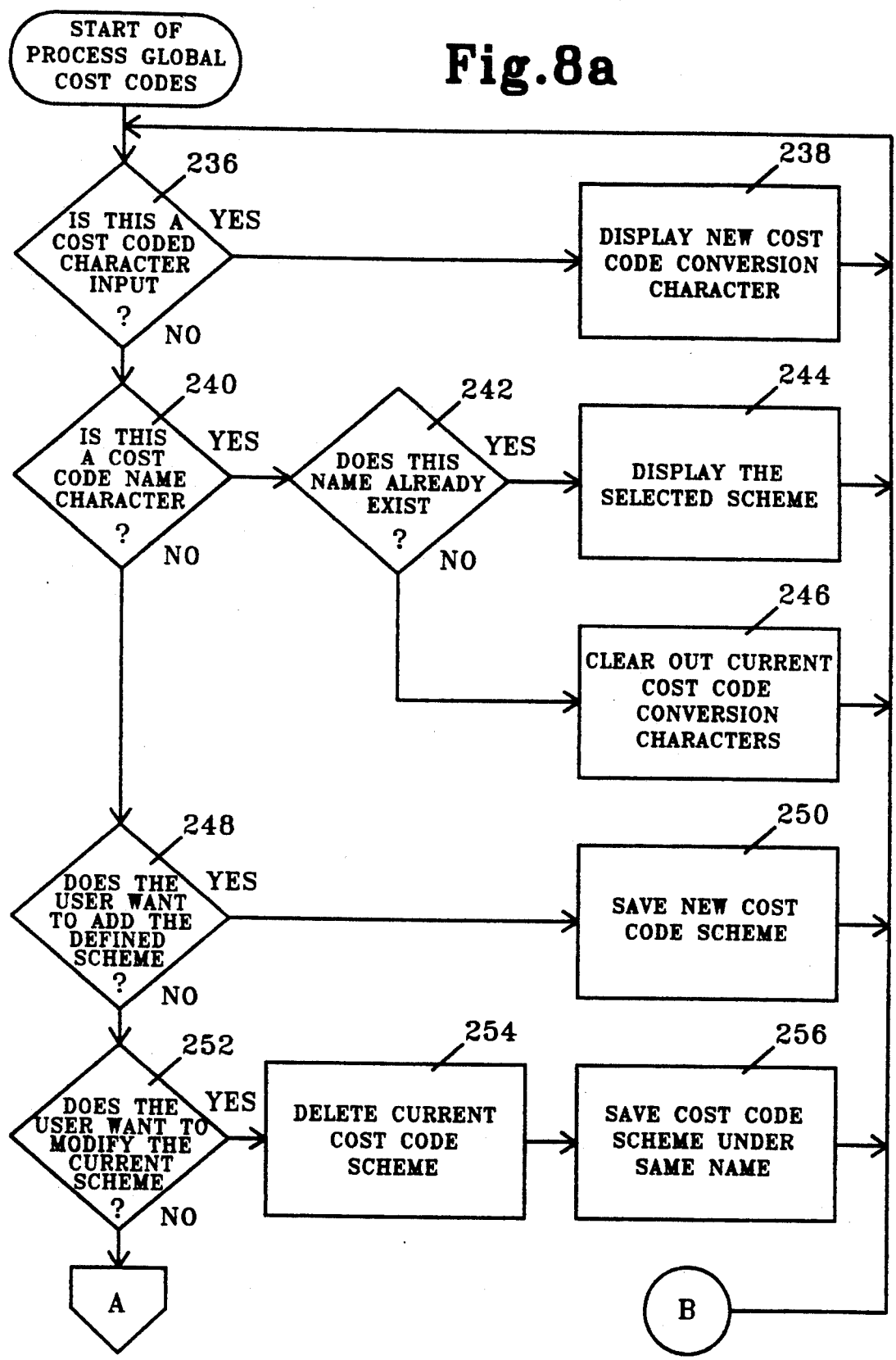
FIGS. 8A and 8B form a flow chart illustrating the Process Global Cost Codes software subroutine of the format editor of the present invention.
Figure 8B:
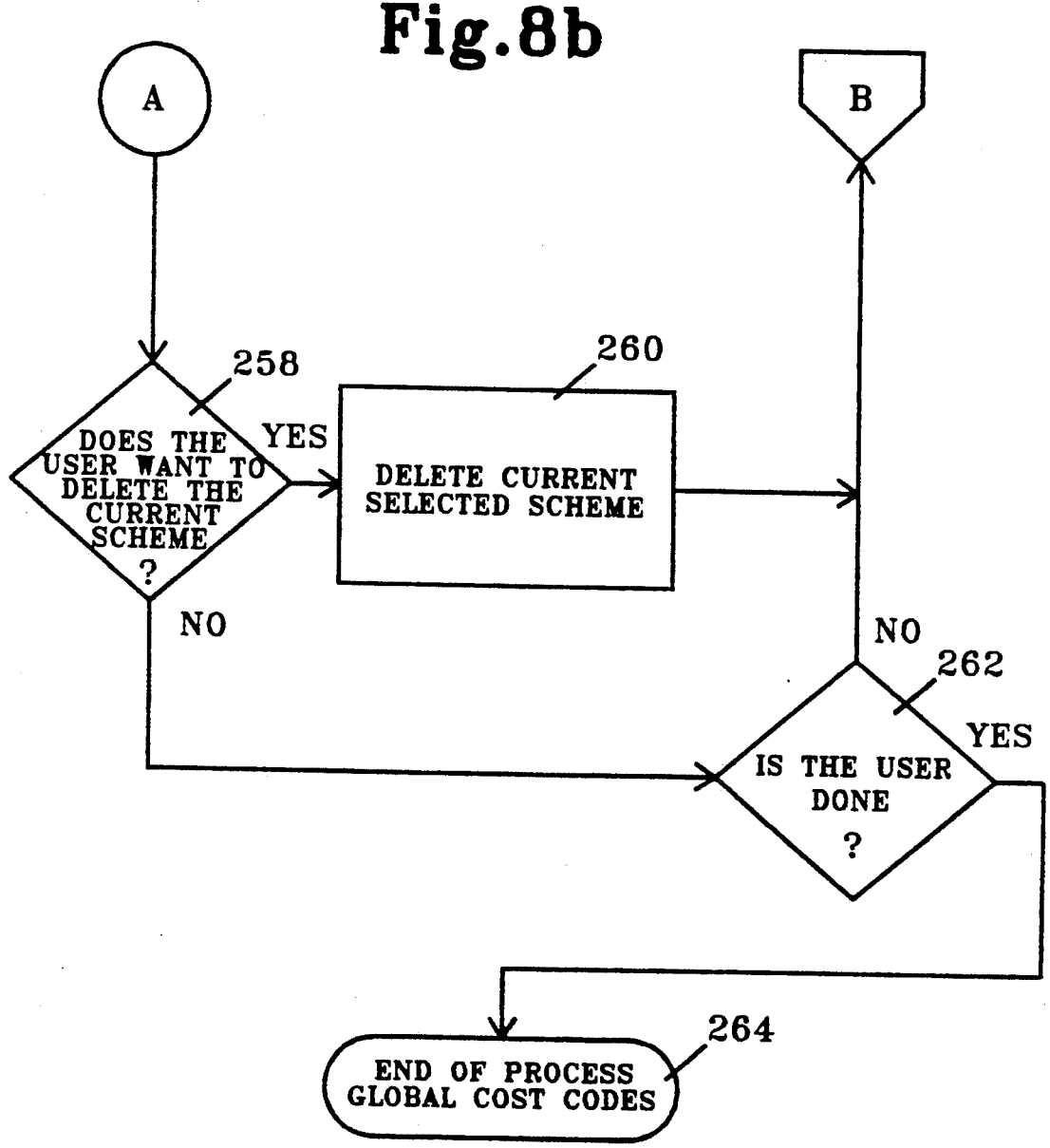

If the cost codes option is selected by the user as determined at block 72, the microprocessor 19 implements the process global cost code routine depicted in FIGS. 8A-B. At block 236 the microprocessor 19 determines whether a character input by the user via the keyboard is a character to be cost coded, i.e., encoded or translated so as to hide the nature of the character. If not, the microprocessor proceeds to block 240 to determine whether the input character is a character in a cost code name. If so, the microprocessor at block 242 determines whether the cost code name already exits and if it does, the microprocessor at block 244 displays the selected cost code translation scheme. If the microprocessor determines that the cost code name does not already exists, the microprocessor proceeds to block 246. At block 246 the microprocessor initializes the display 18 to depict two identical columns of characters representing the characters to be encoded. Upon determining that a character input by the user via the keyboard 16 is a cost code character the microprocessor proceeds from block 236 to block 238 to display the input character in one of the columns and the translation of the character in the other column wherein the original character and its encoded or translated value are in adjacent positions in the two displayed columns. As the user enters the cost coded characters as determined at block 236, the microprocessor 19 thus generates the cost code or translation scheme and displays the scheme to the user at block 238. If the microprocessor determines at block 248 that the user wants to add the defined scheme to the system, the microprocessor proceeds to block 250 to save the new cost code scheme for use by each of the printers 10, 11, 12 and 13. If the microprocessor determines at block 252 that the user wants to modify a current cost code scheme, at block 254 the microprocessor deletes the current cost code scheme and saves the new cost coded characters entered by the user under the same cost code name at block 256. At block 258 the microprocessor determines whether the user wants to delete the current cost code scheme, and if so the microprocessor at block 260 deletes the current scheme by erasing the scheme from memory. If the microprocessor determines at block 262 that the user is done processing the global cost code scheme, the microprocessor exits the Process Global Cost Code routine at block 264.

Because the format editor of the present invention utilizes printer definition files, printers may be added to the system simply by adding a printer definition file for the new printer. Once the printer definition file is in place, the format editor will automatically prompt the user to select from format feature and function options that are supported by that new printer type to aid the user in creating a format for the printer. Because the format editor automatically generates a common printer definition file when the user selects the printer types for a format, it is very easy for a user to use incompatible printers to print a given job. Once a format is created, the printer selection for that format can be changed without corrupting the previously defined field parameters for the format. The validation routine of the format editor automatically determines whether the field parameters previously entered for the format are valid for the new printer type selection and if not, information indicating a possible conflict of feature or function options are displayed to the user so that the user can make the appropriate changes thereto. Further, the stock size specified for a format can be dynamically changed without changing field positions since field positions remain constant relative to a corner of the record member such as the lower left corner of the record member. The format editor also allows a test print of a defined format so that a user can quickly verify field placement without entering data for the fields, dummy data being automatically used for the test print option. In addition, customized global cost codes can be generated and stored separately from formats that reference them, the global cost codes being used by multiple, incompatible printers selected by the user for the format. It is noted that global check digits can also be generated and stored separately from the formats that reference them as well.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. In a barcode identification system having a plurality of barcode printers of various types for printing on a web of record members, each type of barcode printer having an associated set of printer function options selectable by a user to define a layout of fields for a record member, a format generator for generating a single record member layout for multiple types of barcode printers comprising:

input means actuable by a user for selecting printer options including a plurality of printer types for which a record member layout is to be generated;

a memory for storing for each of said selected printer types said associated sets of printer function options;

means for determining the intersection of said sets of printer function options for said selected printer types to create a set of printer function options common to each of said selected printer types; and means for displaying information to said user depicting options from said set of common printer function options, said displayed options being selectable by a user to define a single record member layout for said selected plurality of printer types.

2. A barcode identification system as recited in claim wherein said stored sets of printer function options include a first function, the user selectable option of which includes a maximum value for a range and a minimum value for said range, said intersection determining means creating a first function common to said selected printer types by setting said common first function maximum value equal to the lowest first function maximum value for all of said selected printer types and by setting said common first function minimum value equal to the greatest first function minimum value for all of said selected printer types.

3. A barcode identification system as recited in claim 1 wherein said format generator includes means for storing a record member layout when said layout is generated, said layout including the size of said record member for which the layout is created and the position of said fields on said record member, said input means being actuable by a user to change the stored record member size for said layout; and means for maintaining the position of said fields constant relative to a predetermined position on said web of record members to allow a user to change the size of said web of record members without changing said stored field positions.

4. A barcode identification system as recited in claim including means responsive to a users selection of printer function options from said common set for storing information representing said selected options to define said record member layout, said input means being actuable by a user to change the selected printer types for a previously generated record member layout, said intersection determining means creating a new set of common printer function options in response to said change in selected printer types and including means responsive to said change in selected printer types for determining whether said stored information representing user selected options defining a record member layout is valid for said new set of common printer function options.

5. A barcode identification system as recited in claim 4 including means for controlling said display means to display information indicating the existence of invalid user selected options for said new set of common printer function options.

6. A barcode identification system as recited in claim 1, said input means being actuable by a user to request a printing test for a defined record member layout and including means for setting up fixed data for said defined record member layout; and means for controlling one of said printers to print a test record member with said fixed data in said defined layout.

7. In a barcode identification system having a plurality of barcode printers of various types for printing on a web of record members, each type of barcode printer having an associated set of printer function options selectable by a user to define a layout of fields for a record member, a format generator for generating a single record member layout for multiple types of barcode printers comprising:

input means actuable by a user for selecting printer options including a plurality of printer types for which a record member layout is to be generated;

a memory for storing for each of said selected printer types said associated sets of printer function options;

means responsive to the selection of a plurality of printer types for a record member layout for comparing the sets of printer function options associated with said selected printer types to generate a set of printer function options common to each of said selected printer types; and means for prompting said user to select printer options only from said set of common printer function options to define a single record member layout for said selected plurality of printer types.

8. A barcode identification system as recited in claim 7 including means responsive to a users selection of printer function options from said common set for storing information representing said selected options to define said record member layout, said input means being actuable by a user to change the selected printer types for a previously generated record member layout, said comparing means generating a new set of common printer function options in response to said change in selected printer types and including means responsive to said change in selected printer types for determining whether said stored information representing user selected options defining a record member layout is valid for said new set of common printer function options.

9. A barcode identification system as recited in claim 8 including means for controlling said display means to display information indicating the existence of invalid user selected options for said new set of common printer function options.

10. A barcode identification system as recited in claim 7, said input means being actuable by a user to request a printing test for a defined record member layout and including means for setting up fixed data for said defined record member layout; and means for controlling one of said printers to print a test record member with said fixed data in said defined layout.

11. A barcode identification system as recited in claim 7 wherein said stored sets of printer function options include a first function, the user selectable option of which includes a maximum value for a range and a minimum value for said range, said comparing means generating a first function common to said selected printer types by setting said common first function maximum value equal to the lowest first function maximum value for all of said selected printer types and by setting said common first function minimum value equal to the greatest first function minimum value for all of said selected printer types.

12. A barcode identification system as recited in claim 7 wherein said format generator includes means for storing a record member layout when said layout is generated, said layout including the size of said record member for which the layout is created and the position of said fields on said record member, said input means being actuable by a user to change the stored record member size for said layout; and means for maintaining the position of said fields constant relative to a predetermined position on said web of record members to allow a user to change the size of said web of record members without changing said stored field positions.

13. A barcode identification system as recited in claim 7 including means for generating global cost codes to be used by printers of each of said selected printer types.

14. In a barcode identification system having a plurality of barcode printers of various types for printing on a web of record members, each type of barcode printer having an associated set of printer function options selectable by a user to define a layout of fields for a record member, a format generator for generating a single record member layout for multiple types of barcode printers comprising:

input means actuable by a user for selecting printer options including a plurality of printer types for which a record member layout is to be generated;

a memory for storing for each of said selected printer types said associated sets of printer function options;

means responsive to the selection of a plurality of printer types for a record member layout for comparing the sets of printer function options associated with said selected printer types to generate a set of printer function options common to each of said selected printer types;

means for prompting said user to select printer options only from said set of common printer function options to define a single record member layout for said selected plurality of printer types; and validating means responsive to a user's selection of said printer options for comparing said user selected printer options to said set of common printer function options to determine whether said user selected printer options are valid for said defined record member layout.

15. A barcode identification system as recited in claim 14, said input means being actuable by a user to request a printing test for a defined record member layout and including means for setting up fixed data for said defined record member layout; and means for controlling one of said printers to print a test record member with said fixed data in said defined layout.

16. A barcode identification system as recited in claim 14 wherein said stored sets of printer function options include a first function, the user selectable option of which includes a maximum value for a range and a minimum value for said range, said comparing means generating a first function common to said selected printer types by setting said common first function maximum value equal to the lowest first function maximum value for all of said selected printer types and by setting said common first function minimum value equal to the greatest first function minimum value for all of said selected printer types.

17. A barcode identification system as recited in claim 14 wherein said format generator includes means for storing a record member layout when said layout is generated, said layout including the size of said record member for which the layout is created and the position of said fields on said record member, said input means being actuable by a user to change the stored record member size for said layout; and means for maintaining the position of said fields constant relative to a predetermined position on said web of record members to allow a user to change the size of said web of record members without changing said stored field positions.

18. A barcode identification system as recited in claim 14 wherein said input means is actuable by a user to change the selected printer types for a previously defined record member layout; said comparing means generating a new set of common printer function options for said layout in response to said changed selection of printer types and said validating means to comparing said user selected printer options to said new set of common printer function options to determine whether said user selected printer options are valid for the changed selection of printer types.

19. A barcode identification system as recited in claim 18 including means for controlling said display means to display information indicating the existence of invalid user selected options for said new set of common printer function options.

20. A barcode identification system as recited in claim 7 including means for generating global cost codes to be used by printers of each of said selected printer types.

* * * * *

UNITED STATES PATENT AND TRADEMARK OFFICE
CERTIFICATE OF CORRECTION

PATENT NO. : 5,239,622
DATED : August 24, 1993
INVENTOR(S) : Best, et al.

It is certified that error appears in the above-indentified patent and that said Letters Patent is hereby corrected as shown below:

Column 3, line 7, delete "4" and insert -- 14 -- therefor.

Column 3, line 11, after "computer" insert -- 15 -- therefor.

Column 3, line 12, delete "5".

Column 4, line 37, after "printer for" insert -- printing. A suitable spooler is disclosed in -- therefor.

Column 4, line 38, delete "97-783,765" and insert -- 07-783,765 -- therefor.

Column 6, line 4, delete "(9) download," and insert -- (8) download, -- therefor.

Column 9, line 58, delete "1B" and insert -- 18 -- therefor.

Column 11, line 61, delete "exits" and insert -- exists -- therefor.

Column 11, line 65, delete "exists" and insert -- exist -- therefor.

UNITED STATES PATENT AND TRADEMARK OFFICE
CERTIFICATE OF CORRECTION

PATENT NO. : 5,239,622

DATED : August 24, 1993

INVENTOR(S) : Best, et al.

It is certified that error appears in the above-indentified patent and that said Letters Patent is hereby corrected as shown below:

Claim 2, column 13, line 26, after "claim" insert -- 1 -- therefor.

Claim 4, column 13, line 51, after "claim" insert -- 1 -- therefor.

Signed and Sealed this

Eleventh Day of November, 1997

Attest:

BRUCE LEHMAN

Attesting Officer        Commissioner of Patents and Trademarks